(12) United States Patent
Powell et al.

(10) Patent No.: US 11,697,097 B2
(45) Date of Patent: Jul. 11, 2023

(54) APPARATUS, SYSTEMS, AND METHODS FOR PURIFYING A FLUID WITH A SILICON CARBIDE MEMBRANE

(71) Applicant: 1934612 Ontario Inc., London (CA)

(72) Inventors: Anthony L. Powell, London (CA); Brian E. Butters, London (CA)

(73) Assignee: 1934612 ONTARIO INC., London (CA)

( * ) Notice: Subject to any disclaimer, the term of this patent is extended or adjusted under 35 U.S.C. 154(b) by 56 days.

(21) Appl. No.: 17/160,485

(22) Filed: Jan. 28, 2021

(65) Prior Publication Data
US 2021/0146314 A1    May 20, 2021

Related U.S. Application Data

(62) Division of application No. 15/356,098, filed on Nov. 18, 2016, now Pat. No. 10,940,443.
(Continued)

(51) Int. Cl.
*B01D 69/12* (2006.01)
*B01D 65/00* (2006.01)
(Continued)

(52) U.S. Cl.
CPC ........... *B01D 69/12* (2013.01); *B01D 63/065* (2013.01); *B01D 63/066* (2013.01);
(Continued)

(58) Field of Classification Search
CPC . B01D 9/12; B01D 9/02; B01D 71/02; B01D 71/025; B01D 71/021;
(Continued)

(56) References Cited

U.S. PATENT DOCUMENTS 5,415,775 A    5/1995 Castillon et al.
5,518,624 A    5/1996 Filson et al.
(Continued)

FOREIGN PATENT DOCUMENTS

EP    0270051          6/1988
EP    1541817 A1 *    6/2005
(Continued)

OTHER PUBLICATIONS

Partial Supplementary European Search Report dated Apr. 12, 2019 in connection with European Application No. 16865835.9, 20 pages.
(Continued)

*Primary Examiner* — Pranav N Patel
(74) *Attorney, Agent, or Firm* — Baker & McKenzie LLP

(57) ABSTRACT

The present disclosure relates, according to some embodiments, to systems, apparatus, and methods for fluid purification (e.g., water) with a ceramic membrane. For example, the present disclosure relates, in some embodiments, to a cross-flow fluid filtration assembly comprising (a) membrane housing comprising a plurality of hexagonal prism shaped membranes (b) an inlet configured to receive the contaminated fluid and to channel a contaminated fluid to the first end of the plurality of hexagonal prism shaped membranes, and (c) an outlet configured to receive a permeate released from the second end of the plurality of hexagonal shaped membranes. The present disclosure also relates to a cross-flow fluid filtration module comprising a fluid path defined by a contaminated media inlet chamber, a fluid filtration assembly positioned in a permeate chamber and a concentrate chamber.

13 Claims, 7 Drawing Sheets

Related U.S. Application Data

(60) Provisional application No. 62/258,274, filed on Nov. 20, 2015.

(51) Int. Cl.
*B01D 67/00* (2006.01)
*B01D 71/02* (2006.01)
*B01D 69/02* (2006.01)
*B01D 63/06* (2006.01)

(52) U.S. Cl.
CPC ....... *B01D 65/003* (2013.01); *B01D 67/0039* (2013.01); *B01D 67/0041* (2013.01); *B01D 67/0046* (2013.01); *B01D 67/0083* (2013.01); *B01D 67/0088* (2013.01); *B01D 69/02* (2013.01); *B01D 71/02* (2013.01); *B01D 71/021* (2013.01); *B01D 71/024* (2013.01); *B01D 71/025* (2013.01); *B01D 71/027* (2013.01); *B01D 2315/10* (2013.01); *B01D 2319/04* (2013.01); *B01D 2325/20* (2013.01)

(58) Field of Classification Search
CPC .. B01D 71/027; B01D 63/066; B01D 63/065; B01D 67/0083; B01D 67/0088; B01D 67/0046; B01D 67/0039; B01D 65/003; B01D 2325/20; B01D 2315/10; B01D 2319/04; B01D 67/0041; B01D 69/02; B01D 71/024; B04D 46/2444
See application file for complete search history.

(56) References Cited

U.S. PATENT DOCUMENTS

| | | | |
|---|---|---|---|
| 5,655,212 A | 8/1997 | Sekhar et al. | |
| 2005/0077226 A1 | 4/2005 | Bishop et al. | |
| 2006/0166820 A1 | 7/2006 | Ogyu et al. | |
| 2006/0216466 A1* | 9/2006 | Yoshida | B01D 39/2093 428/116 |
| 2006/0236668 A1 | 10/2006 | Stobbe et al. | |
| 2011/0099969 A1* | 5/2011 | Ku | C01B 3/12 60/39.12 |
| 2011/0100910 A1* | 5/2011 | Johansen | B01D 67/0046 210/500.21 |
| 2013/0022510 A1 | 1/2013 | Keshavan et al. | |
| 2013/0126420 A1 | 5/2013 | Teranishi et al. | |
| 2015/0008177 A1* | 1/2015 | Yajima | C04B 38/0019 210/488 |
| 2015/0284271 A1 | 10/2015 | Powell et al. | |

FOREIGN PATENT DOCUMENTS

| | | |
|---|---|---|
| EP | 2559470 | 2/2013 |
| JP | H06-172057 A | 6/1994 |
| JP | 2004358355 A | 12/2004 |
| JP | 2012-008476 | 1/2012 |
| JP | 2013-193920 A | 9/2013 |
| JP | 2015-512535 A | 7/2015 |
| WO | 9830315 | 7/1998 |
| WO | 03024892 | 3/2003 |
| WO | 2008050813 | 5/2008 |

OTHER PUBLICATIONS

International Search Report and Written Opinion dated Mar. 16, 2017 in connection with International Application No. PCT/IB2016/001748.
Extended European Search Report dated Jul. 26, 2019 in connection with European Application No. 16865835.9, 18 pages.
European Examination Report dated May 6, 2020 in connection with European Application No. 16865835.9, 7 pages.
Notice of Reasons for Refusal dated Apr. 13, 2021 in connection with Japanese Application No. 2018-526249, 12 pages.

\* cited by examiner

APPARATUS, SYSTEMS, AND METHODS FOR PURIFYING A FLUID WITH A SILICON CARBIDE MEMBRANE

CROSS-REFERENCE TO RELATED APPLICATIONS

This application is a divisional of U.S. patent application Ser. No. 15/356,098 filed on Nov. 18, 2016, which claims priority to U.S. Provisional Patent Application No. 62/258,274 filed on Nov. 20, 2015. The contents of the above applications are hereby incorporated in their entirety by reference.

FIELD OF THE DISCLOSURE

The present disclosure relates, in some embodiments, to apparatus, systems, and methods for decontaminating a fluid (e.g., water) with a ceramic membrane.

BACKGROUND OF THE DISCLOSURE

Since almost all forms of life need water to survive, the improvement of water quality in decontamination systems has typically been a subject of significant interest. As a result, treatment systems and techniques for removing contaminants from contaminated fluids have been developed in the past. Approaches include water treatment by applying various microorganisms, enzymes, and nutrients for the microorganisms in water. Other approaches involve placing chemicals in the contaminated fluids, such as chlorine, in an effort to decontaminate supplies. These additives can, however, create more problems than they solve. Some approaches avoid the use of added chemicals or microorganisms by using a filtration and/or irradiation strategy. Such systems have either failed or failed to realize their potential, such that challenges remain.

SUMMARY

Accordingly, a need exists for improved fluid purification. For example, a need exists for fluid purification apparatus, systems, and methods that display improved transmembrane pressure performance.

The present disclosure relates, according to some embodiments, to a ceramic membrane that may comprise: a substrate configured to have a first surface, a second surface, and body; a binder; a first membrane layer on at least a portion of the first surface of the membrane; and a second membrane layer on at least a portion of the second surface of the membrane; and a third membrane layer on at least a portion of the body of the membrane, wherein the membrane may be configured to have a clean water flux of about 2000 liters per hour per square meter of membrane surface area at a transmembrane pressure of about 20 psi or less. A substrate may comprise a substance selected from the group consisting of alumina, zirconium dioxide, titanium dioxide, silicon carbide. A system may be configured to have a transmembrane pressure of about 20 psi or less at about 20° C. A binder may comprise a substance selected from the group consisting of tylose, polyvinyl acetate, polypropylene, sodium polyacrylate, polypropylene carbonate, carboxymethylcellulose, starches, polyvinyl alcohol, dextrin, wax emulsions, polyethylene glycols, lignosulfonates, paraffins, sodium silicate, magnesium aluminum silicates, and bentonite. A substrate may have an average pore size from about 3 μm to about 10 μm. A ceramic membrane may have a vertex to vertex diameter from about 38 mm to about 90 mm A ceramic membrane may be a hexagonal prism. A ceramic membrane may have a vertex to vertex diameter of about 80 mm A ceramic membrane may have a length from about 800 mm to about 1600 mm A first membrane layer may comprise a substance selected from the group consisting of alumina; zirconium dioxide; titanium dioxide; or silicon carbide. A second membrane layer may comprise a substance selected from the group consisting of alumina; zirconium dioxide; titanium dioxide; or silicon carbide. A third membrane layer may comprise a substance selected from the group consisting of alumina; zirconium dioxide; titanium dioxide; or silicon carbide. In some embodiments, up to three coats of a first membrane layer may be contacted to at least a portion of a first surface of the membrane. Up to three coats of a second membrane layer may be contacted to at least a portion of a second surface of the membrane. Up to three coats of a third membrane layer may be contacted to at least a portion of a body of the membrane.

In some embodiments, the present disclosure relates to a method of making a ceramic membrane may comprise: extruding a substrate material to form a length of extruded membrane having at least a first surface, a second surface, and a body; drying an extruded membrane substrate to form a ceramic membrane substrate; contacting a first membrane layer to at least a portion of the first surface; contacting a second membrane layer to at least a portion of the second surface; and contacting a third membrane layer to at least a portion of the body. A substrate material may comprise a binder and a substrate base. A substrate base may comprise a substance selected from the group consisting of alumina, zirconium dioxide, titanium dioxide, silicon carbide. A binder may comprise a substance selected from the group consisting of tylose, polyvinyl acetate, polypropylene, sodium polyacrylate, polypropylene carbonate, carboxymethylcellulose, starches, polyvinyl alcohol, dextrin, wax emulsions, polyethylene glycols, lignosulfonates, paraffins, sodium silicate, magnesium aluminum silicates, and bentonite. A membrane layer may comprise a substance selected from the group consisting of alumina, zirconium dioxide, titanium dioxide, silicon carbide. A first membrane layer may comprise a substance selected from the group consisting of alumina; zirconium dioxide; titanium dioxide; or silicon carbide. A second membrane layer may comprise a substance selected from the group consisting of alumina; zirconium dioxide; titanium dioxide; or silicon carbide. A third membrane layer may comprise a substance selected from the group consisting of alumina; zirconium dioxide; titanium dioxide; or silicon carbide. A substrate material may have an average pore size from about 3 μm to about 10 μm. A ceramic membrane may be a hexagonal prism. A hexagonal prism may have a vertex-to-vertex diameter from about 38 mm to about 90 mm A ceramic membrane may have a length from about 800 mm to about 1600 mm.

According to some embodiments, a fluid filtration system may comprise: a membrane housing, the membrane housing comprising: (a) an inlet configured to receive a contaminated fluid; (b) a plurality of membranes configured to filter the contaminated fluid to form a permeate, wherein each of the plurality of membranes may comprise: a first end configured to receive the contaminated fluid; a second end configured to release the permeate; a length extending between the first and the second end; and at least one channel oriented along a longitudinal axis from the first end to the second end; (c) a connector adjacent to the inlet and configured to channel the contaminated fluid to the first end of the plurality of membranes; and (d) an outlet configured to receive the permeate released from the second end, wherein the membrane housing encloses the plurality of membranes such that the length of the plurality of membranes may be substantially parallel to a longitudinal axis of the membrane housing. In some embodiments, a plurality of membranes further may comprise: a substrate; and a ceramic material forming a membrane. A substrate may comprise a substance selected from alumina, zirconium dioxide, titanium dioxide, or silicon carbide. A plurality of membranes further may comprise a ceramic coating comprising a substance selected from alumina, zirconium dioxide, titanium dioxide, or silicon carbide. Each membrane of the plurality of membranes may be a hexagonal prism. A hexagonal prism may comprise a vertex-to-vertex diameter between about 38 mm to about 90 mm. In some embodiments, at least one channel may comprise a shape selected from circle, square, triangle, trapezium, diamond, rhombus, parallelogram, rectangle, pentagon, hexagon, octagon, nonagon, oval, or hexagon. A section of the at least one channel defines a circle having a diameter from about 4 to about 6 mm A membrane housing may comprise up to about 171 membranes. A membrane housing may comprise from about 1 to about 200 membranes. A membrane housing may comprise about 30 to about 40 membranes. In some embodiments, an effective membrane surface area may be from about 0.5 $m^2$ to about 600 $m^2$.

According to some embodiments, a method for filtering fluid may comprise a soluble or insoluble contaminant and a fluid, the method comprising: flowing contaminated fluid from the fluid inlet end of a membrane housing comprising a plurality of hexagonal prism shaped membranes to the fluid outlet end of the membrane housing, wherein the permeate may be released from the membrane housing.

A contaminated fluid filtration system comprising: a membrane casing and a plurality of membranes; at least one about 800 mm to about 1600 mm length hexagonal prism shaped membrane for filtering a contaminated fluid that receives the contaminated fluid at a proximal end and releases a permeate at a distal end; at least one hexagonal prism shaped membrane with a vertex-to-vertex diameter of about 80 mm; a membrane count from about 29 to about 43; at least one membrane without a permeate channel; a binder; and an effective membrane surface area of about 110 $m^2$ to about 165 $m^2$, wherein the system may be configured to have a clean water flux of about 2000 liters per hour per square meter of membrane surface area at a transmembrane pressure of about 20 psi or less at about 20° C.

BRIEF DESCRIPTION OF THE DRAWINGS

Some embodiments of the disclosure may be understood by referring, in part, to the present disclosure and the accompanying drawings, wherein.

TABLE 1

Figure 1A:
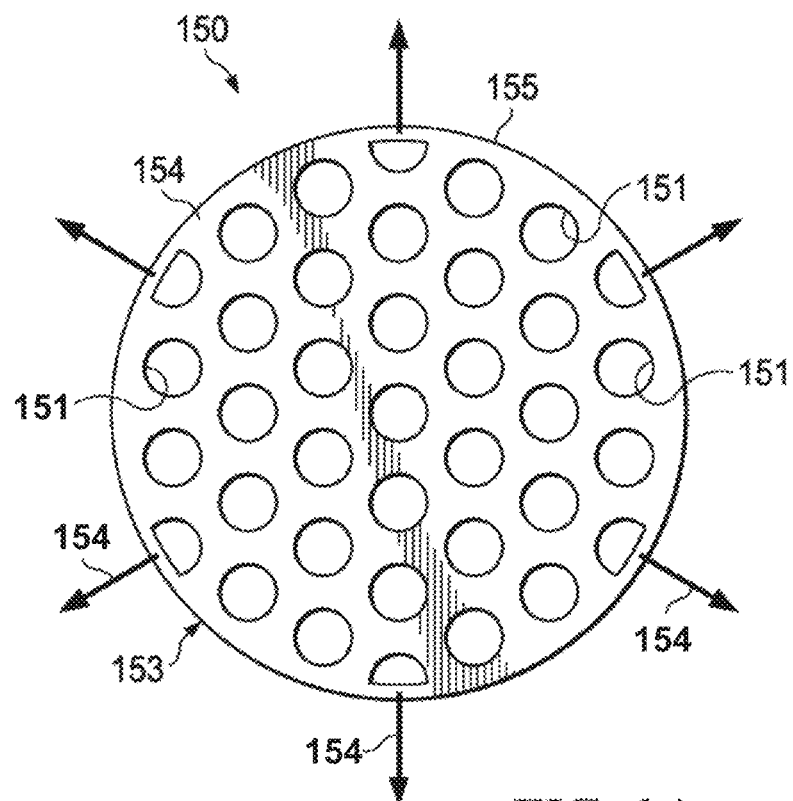
FIG. 1A illustrates a cross-sectional view of a cylindrical ceramic membrane, according to an example embodiment of the disclosure.
Figure 1B:
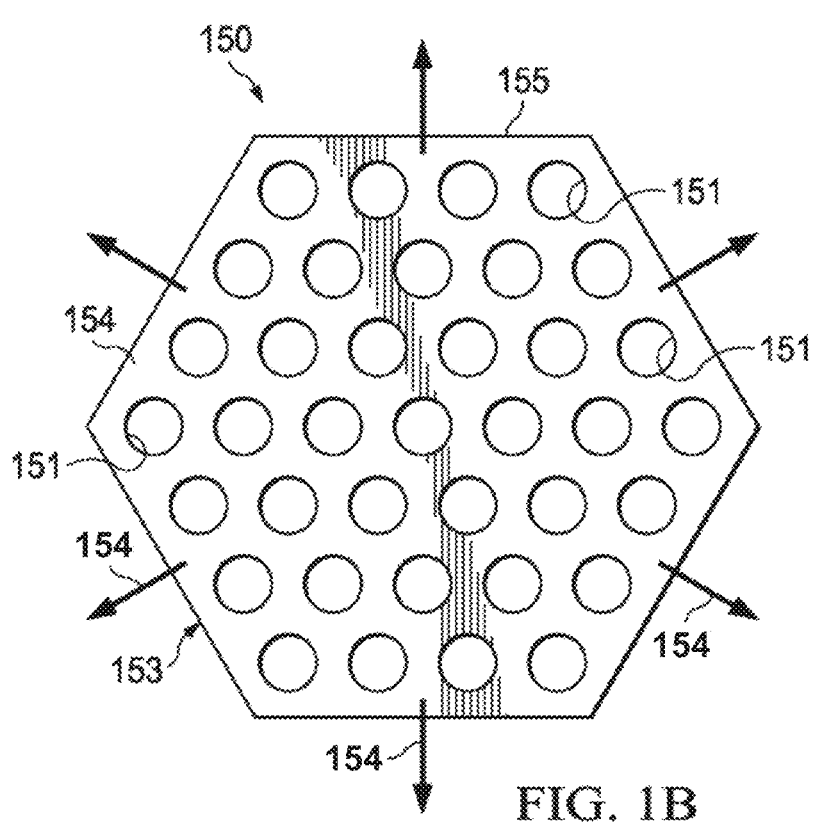
FIG. 1B illustrates a cross-sectional view of a hexagonal prism shaped ceramic membrane, according to an example embodiment of the disclosure.
Figure 2A:
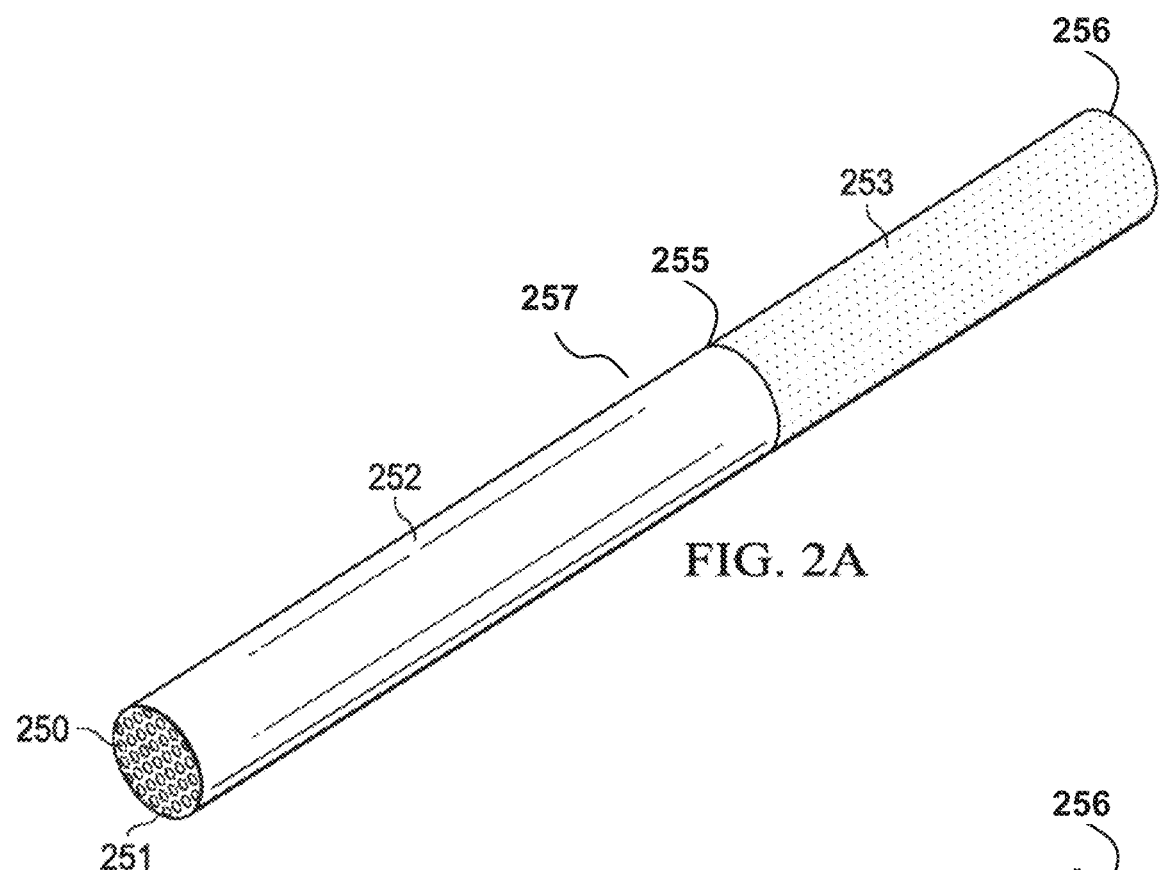
FIG. 2A illustrates a perspective view of a cylindrical ceramic membrane, according to an example embodiment of the disclosure.
Figure 2B:
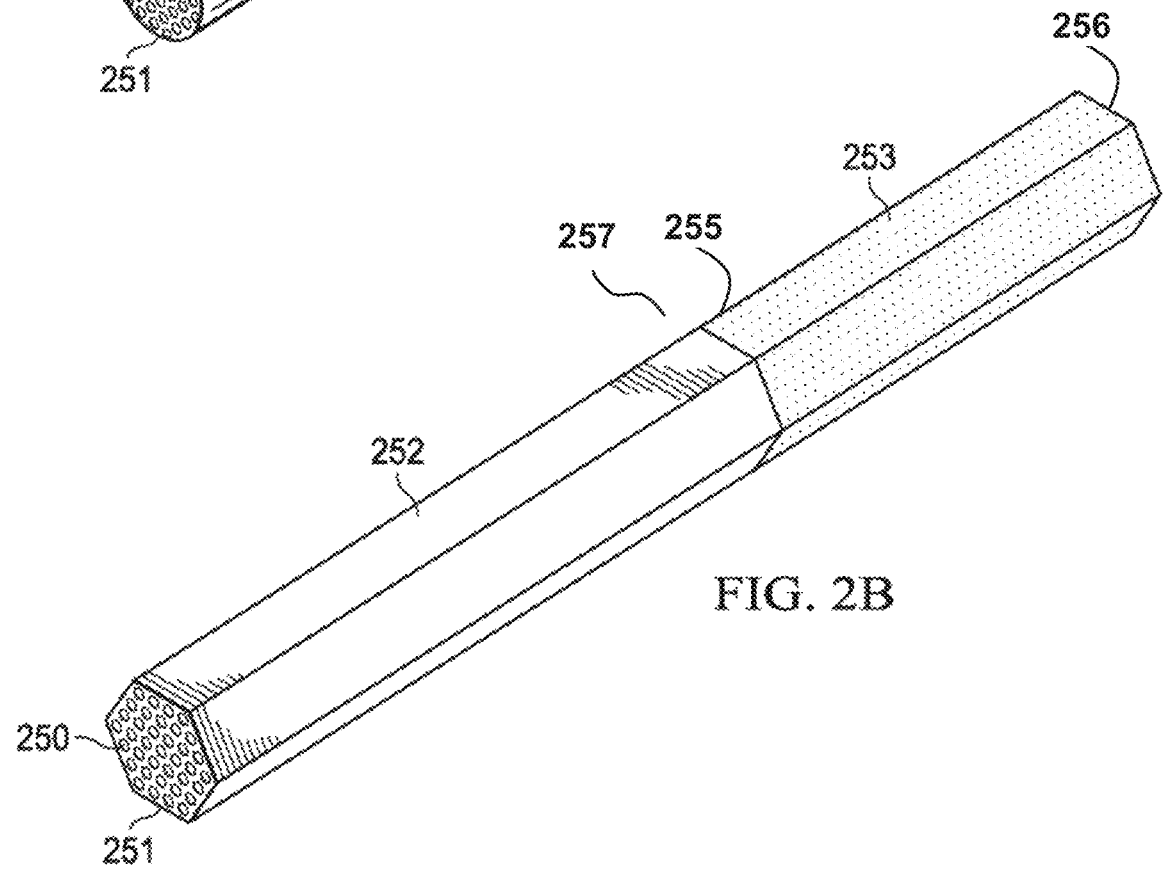
FIG. 2B illustrates a perspective view of a hexagonal prism shaped ceramic membrane, according to an example embodiment of the disclosure.
Figure 3:
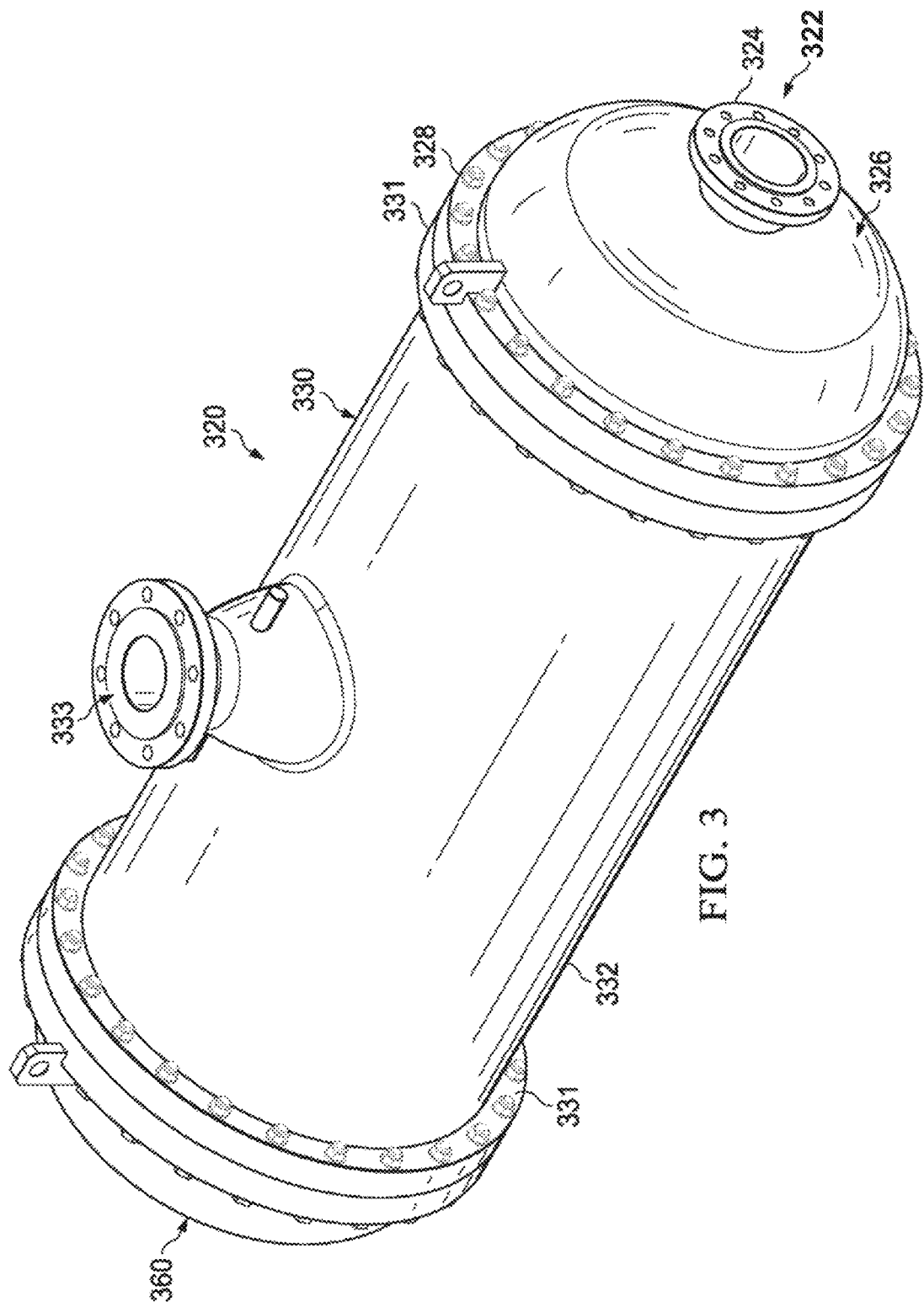
FIG. 3 illustrates a perspective view of a purification module, according to an example embodiment of the disclosure.
Figure 4:
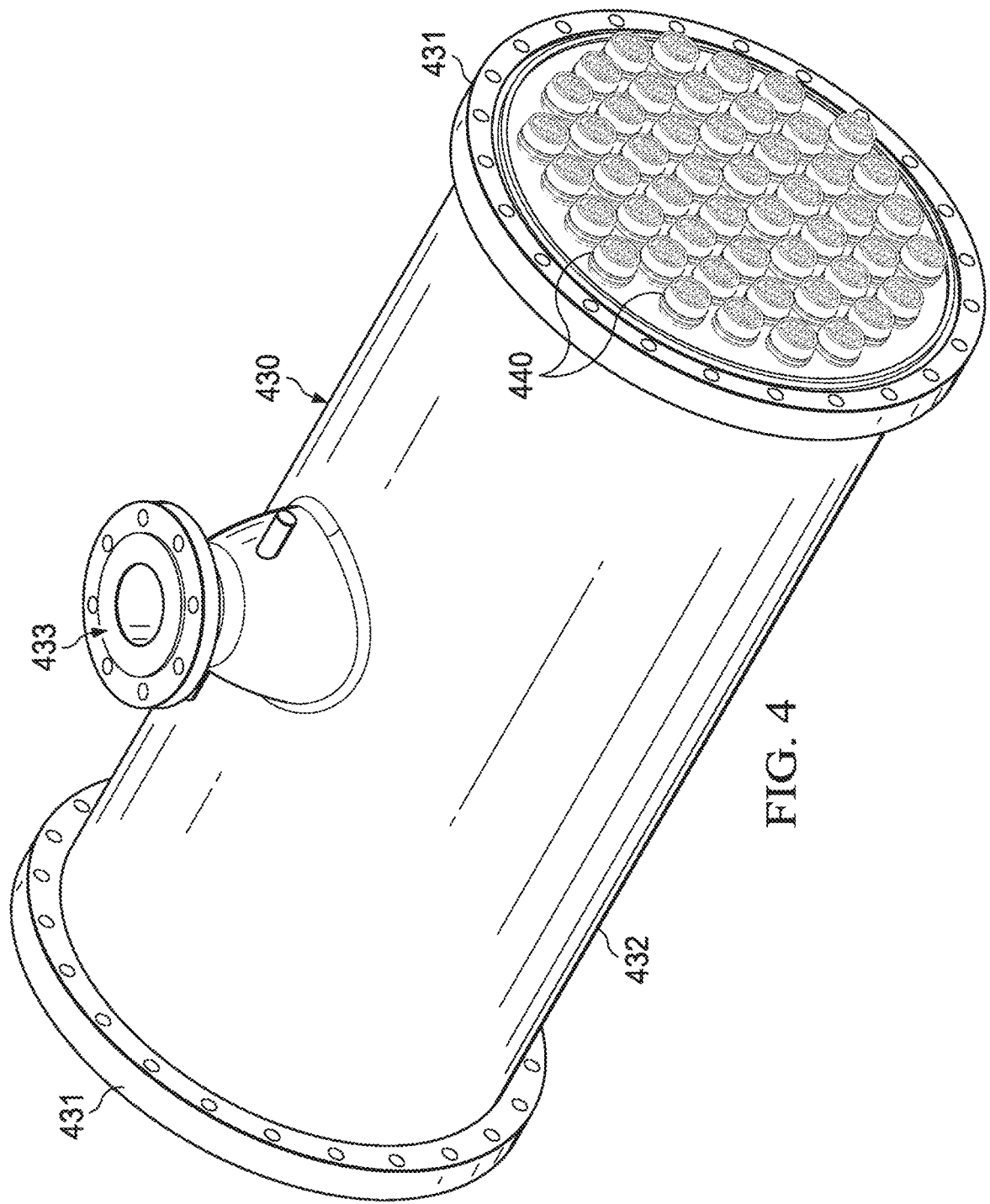
FIG. 4 illustrates a perspective view of a permeate chamber with engaged ceramic membrane, according to an example embodiment of the disclosure.
Figure 5A:
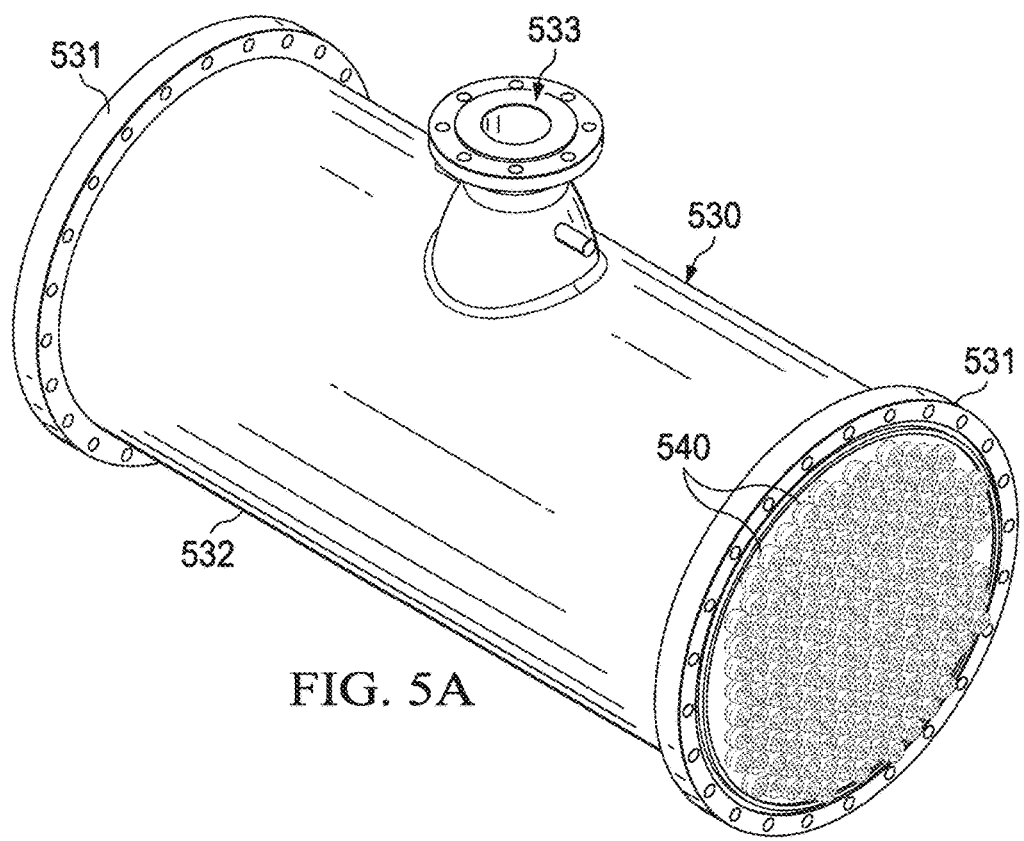
FIG. 5A illustrates a perspective view of a permeate chamber with 171 engaged ceramic membranes, according to an example embodiment of the disclosure.
Figure 6A:
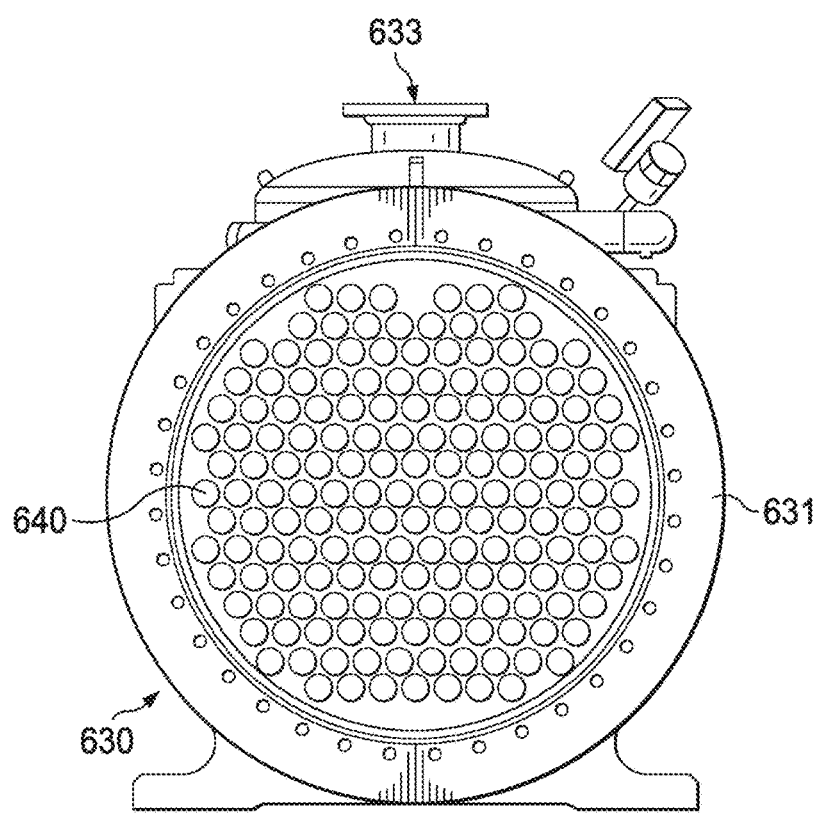
FIG. 6A illustrates a cross-sectional view of a permeate chamber with 171 engaged ceramic membranes, according to an example embodiment of the disclosure.
Figure 5B:
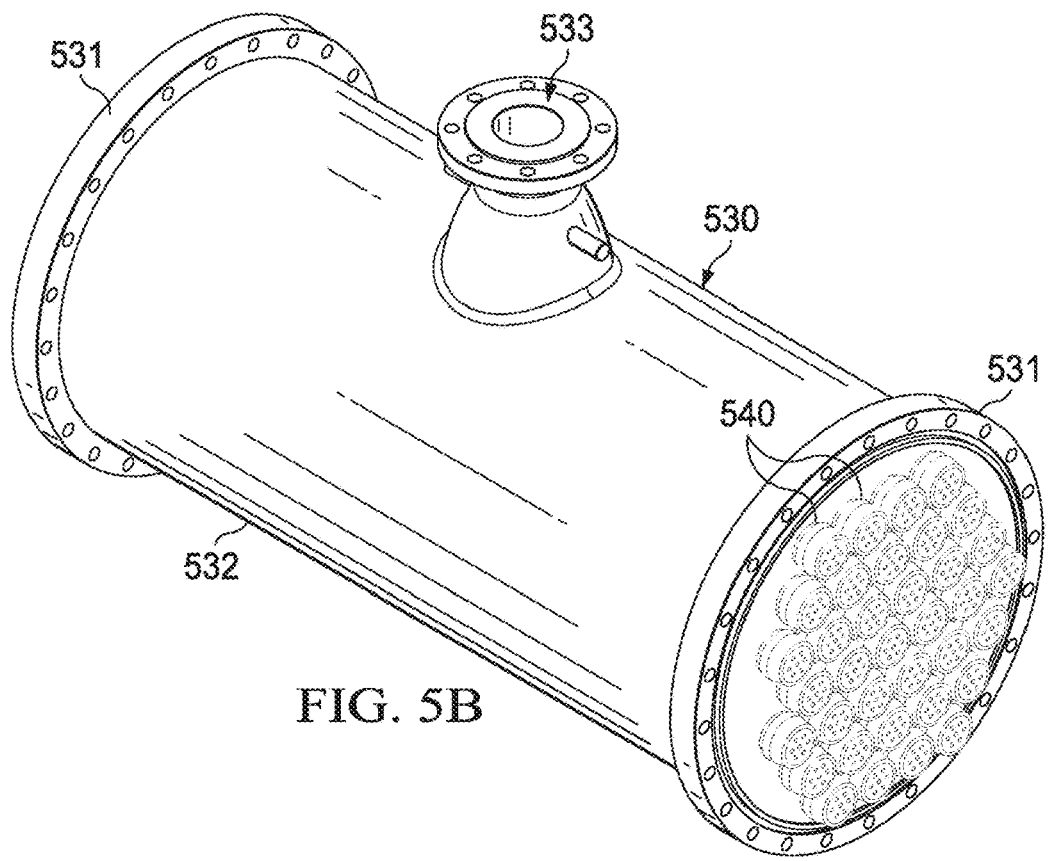
FIG. 5B illustrates a perspective view of a permeate chamber with 36 engaged ceramic membranes, according to an example embodiment of the disclosure.
Figure 6B:
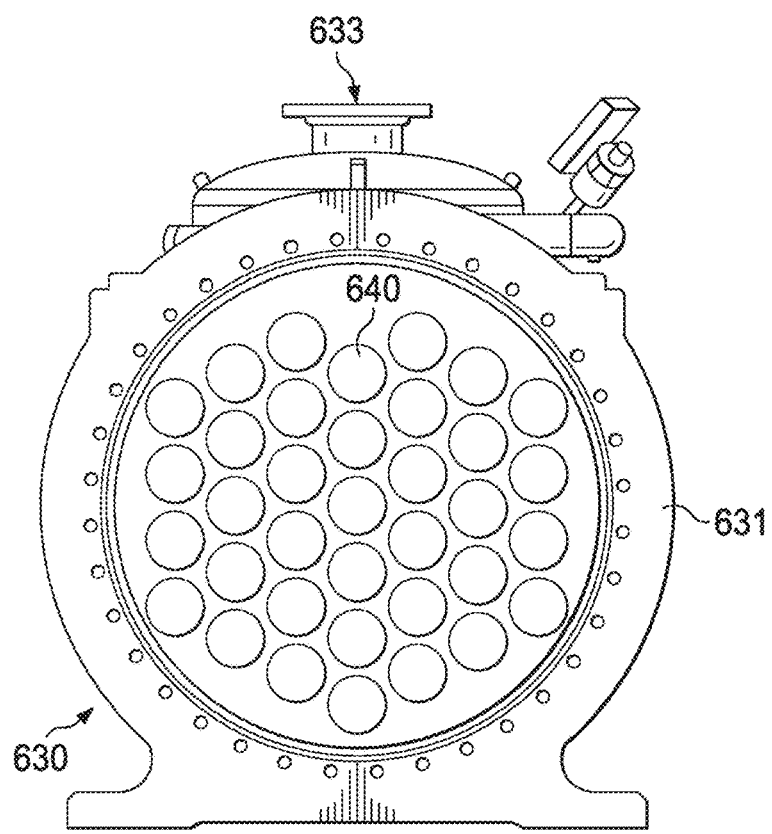
FIG. 6B illustrates a cross-sectional view of a permeate chamber with 36 engaged ceramic membranes, according to an example embodiment of the disclosure.
Figure 7:
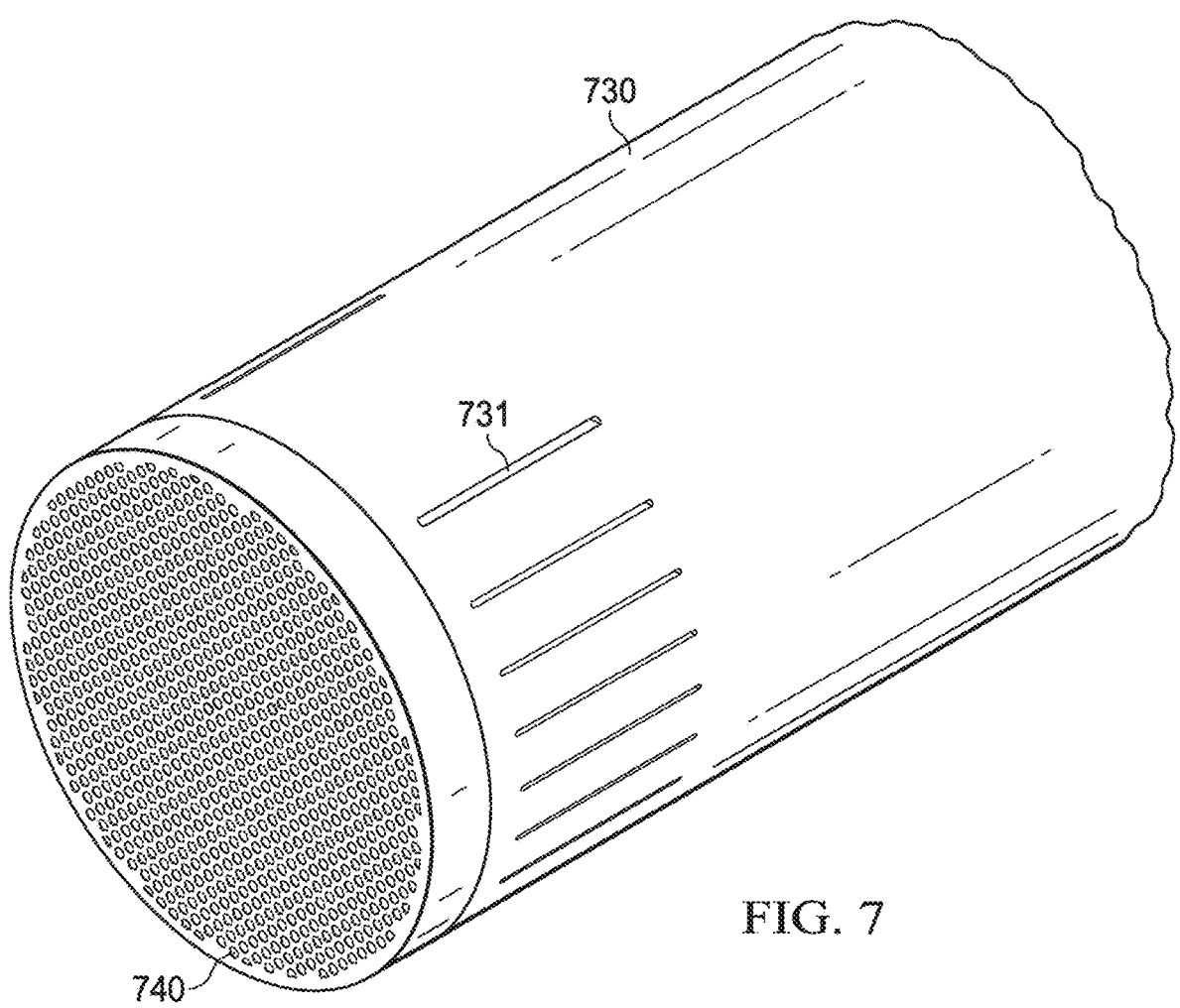
FIG. 7 illustrates a perspective view of a cylindrical ceramic membrane, according to an example embodiment of the disclosure.

|  | Fig. 1A | Fig. 1B | Fig. 2A | Fig. 2B | Fig. 3 | Fig. 4 | Fig. 5A | Fig. 5B | Fig. 6A | Fig. 6B | Fig. 7 |
|---|---|---|---|---|---|---|---|---|---|---|---|
| Ceramic Element | 150 | 150 | 257 | 257 |  |  |  |  |  |  | 730 |
| Channel | 151 | 151 | 250 | 250 |  |  |  |  |  |  | 740 |
| Filtration Layer |  |  | 252 | 252 |  |  |  |  |  |  |  |
| Substrate | 153 | 153 | 253 | 253 |  |  |  |  |  |  |  |
| First Face | 154 | 154 | 251 | 251 |  |  |  |  |  |  |  |
| Second Face |  |  | 256 | 256 |  |  |  |  |  |  |  |
| Elongate Side | 155 | 155 | 255 | 255 |  |  |  |  |  |  |  |
| Purification Module |  |  |  |  | 320 |  |  |  |  |  |  |
| Contaminated Media Chamber Inlet |  |  |  |  | 322 |  |  |  |  |  |  |
| Inlet |  |  |  |  | 324 |  |  |  |  |  |  |
| Contaminated Media Chamber Body |  |  |  |  | 326 |  |  |  |  |  |  |
| Flange |  |  |  |  | 328 |  |  |  |  |  |  |
| Permeate Chamber |  |  |  |  | 330 | 430 | 530 | 530 |  |  |  |
| Flange |  |  |  |  | 331 | 431 | 531 | 531 | 630 | 630 |  |
| Permeate Chamber Body |  |  |  |  | 332 | 432 | 532 | 532 | 631 | 631 |  |

TABLE 1-continued

|  | Fig. 1A | Fig. 1B | Fig. 2A | Fig. 2B | Fig. 3 | Fig. 4 | Fig. 5A | Fig. 5B | Fig. 6A | Fig. 6B | Fig. 7 |
|---|---|---|---|---|---|---|---|---|---|---|---|
| Outlet |  |  |  |  | 333 | 433 | 533 | 533 | 633 | 633 |  |
| Ceramic Element Assembly |  |  |  |  |  | 440 | 540 | 540 | 640 | 640 |  |
| Concentrate Chamber |  |  |  |  | 360 |  |  |  |  |  |  |
| Permeate Channel |  |  |  |  |  |  |  |  |  |  | 731 |

DETAILED DESCRIPTION

The present disclosure relates, in some embodiments, to systems, apparatus, and methods for fluid purification (e.g., chemical-free purification). In some embodiments, the present disclosure relates to systems, apparatus, and methods for fluid filtration (e.g., water). For example, a system for fluid filtration may comprise a contaminated media stream, a purification module, a permeate stream, and combinations thereof. A system optionally may comprise a concentrate stream, one or more pumps, one or more valves, one or more compressed gas sources, one or more storage tanks, and combinations thereof. A concentrate stream may have a higher concentration of one or more contaminants than a corresponding contaminated media feed, for example, because of volume lost as permeate. In some embodiments, permeate may be collected as a finished product or subjected to further purification measures. A concentrate stream may be collected as a final water product or subjected to further purification measures. Additional purification measures may include, for example, oxidation, ultraviolet irradiation, photo-catalysis, filtration, and combinations thereof. For example, a concentrate stream may be filtered more than once using the same or another filter. A concentrate stream to be recycled through the same filter may or may not be combined with naïve contaminated media. In some embodiments, the present disclosure relates to a method of filtering fluid comprising a soluble or insoluble contaminant and a fluid, the method comprising flowing contaminated fluid from the fluid inlet end of a membrane housing comprising a plurality of hexagonal prism shaped membranes to the fluid outlet end of the membrane housing, wherein the permeate is released from the membrane housing.

In some embodiments, systems, and methods may include at least one ceramic element that may provide both size filtration and charge adsorption. Unlike reverse osmosis, ceramic membranes may advantageously be cleaned with aggressive chemicals (e.g., hydrochloric acid, nitric acid, sodium hydroxide, sulfuric acid) and may have a usable life of more than 25 years. Further, a concentrate stream containing charged particles (e.g., brine) may be more concentrated than, for example, existing Total Dissolved Solids (TDS) removal technologies. In some embodiments, systems, and methods (e.g., crossflow operation) may advantageously have less (e.g., substantially less) fouling in comparison to reverse osmosis membranes. In some embodiments, operating costs may be lower (e.g., substantially lower) than other desalination technologies (e.g., electro-dialysis reversal and/or reverse osmosis). High surface area (e.g., extremely high surface area) of purification substrates may provide high capacity for charge removal before substrate desorption is required or desired. Other types of ceramic substrates (e.g., zinc oxide, silicon carbide, titanium carbide, barium titanate) may have increased or decreased electrical conductivity and may be more efficient by providing greater charges.

Fluid Filtration System

The present disclosure relates, in some embodiments, to filtration systems. For example, a filtration system may comprise a contaminated media chamber having an inlet to admit contaminated media and an end plate, the end plate comprising a plurality of frusto-conical openings; a permeate chamber having a cylindrical body and an end plate at each end, each end plate comprising a plurality of frusto-conical openings, and/or a filtration assembly in fluid communication with both a contaminated media chamber and a permeate chamber. A filtration module may comprise, according to some embodiments, a membrane housing and a plurality of membranes, wherein each of the plurality of membranes configured as a hexagonal prism comprising a first end configured to receive a contaminated fluid, a second end configured to release a permeate, a length, and at least one channel oriented along a longitudinal axis from the first to the second end and configured to filter the contaminated fluid to form the permeate; and wherein the membrane housing encloses the plurality of membranes such that the length of the plurality of membranes substantially parallel to a longitudinal axis of the membrane housing, wherein the membrane housing comprises an inlet configured to receive the contaminated fluid, a connector adjacent to the inlet and configured to channel the contaminated fluid to the first end of the plurality of membranes, and an outlet configured to receive the permeate released form the second end. A fluid filtration system, wherein the plurality of membranes may further comprise a substrate, a ceramic material, and a binder configured to adhere the ceramic material prior to drying and firing the ceramic.

A ceramic element may be in fluid communication with a contaminated media chamber and/or a permeate chamber. According to some embodiments, a contaminated media chamber (e.g., a contaminated media chamber cavity) may be in fluid communication with a permeate chamber ((e.g., a permeate chamber cavity) via a ceramic element. According to some embodiments, a ceramic element may engage a contaminated media chamber interface and/or a permeate chamber interface. A gasket may include a body configured to form a fluid-tight (e.g., liquid-tight) seal (e.g., a triple seal) restricting or preventing fluid flow from a contaminated media chamber to a permeate chamber except through a ceramic element. For example, a gasket may form a seal between a contaminated media chamber and a permeate chamber, between a contaminated media chamber and the environment, between the environment and the permeate chamber, between a contaminated media chamber and the permeate chamber-facing surface of a ceramic element, between a contaminated media chamber end plate and a permeate chamber end plate, and/or between a (e.g., each)

frusto-conical opening of a contaminated media chamber end plate and a (e.g., each) frusto-conical opening of a permeate chamber end plate.

According to some embodiments, fluid filtration system maybe designed to regulate transmembrane pressure (TMP), or the pressure that may be needed to press at least a portion of a fluid through at least a portion of a membrane. In some embodiments, TMP may be a pressure gradient of a membrane and/or an average feed pressure minus a permeate pressure. In some embodiments, a system may include at least one hexagonal prism shaped membrane (e.g., about 800 mm to about 1600 mm in length). A hexagonal prism shaped membrane may have a vertex to vertex diameter of about 80 mm A hexagonal prism shaped membrane may have a permeate channel. At least one of the hexagonal prism shaped membranes may not have a permeate channel A fluid filtration system may comprise a membrane count of about 29 to about 43 membranes. A hexagonal prism shaped membrane may comprise a binder to adhere the ceramic material prior to drying and/or firing. A fluid filtration system may comprise an effective membrane surface area of about 110 $m^2$ to about 165 $m^2$. A fluid filtration system may comprise an effective membrane surface are from about 0.5 $m^2$ to about 600 $m^2$. In some embodiments, a fluid filtration system may be configured to have a clean water flux of about 2000 liters per hour per square meter of membrane surface area ("LMH")

Contaminated Media Chamber

A contaminated media chamber may comprise, in some embodiments, an inlet and a ceramic membrane interface, according to some embodiments. A contaminated media chamber may comprise an interior cavity. An interior cavity may have any desired size and/or any desired shape. For example, a cavity may have a rounded and/or generally dome shape. A contaminated media chamber may have an outer perimeter and/or circumference. In some embodiments an outer perimeter and/or circumference may be configured as and/or define a contaminated media chamber flange. A contaminated media chamber flange may be configured to engage a permeate chamber (e.g., a permeate chamber comprising a similar or mated flange). In some embodiments, a contaminated media chamber flange may comprise a channel for a gasket, O-ring, or other seal. A contaminated media chamber channel may be positioned on one face of a flange and/or substantially parallel to an outer perimeter and/or circumference in some embodiments.

According to some embodiments, a contaminated media chamber may have one or more inlets and/or one or more outlets. For example, a contaminated media chamber may have a ceramic element interface comprising one or more outlets. Each outlet may be configured to engage a ceramic element, for example, with a substantially fluid-tight seal. In some embodiments, an outlet may have any desired shape (e.g., cylindrical, conical, frusto-conical). All contaminated media chamber outlets may be positioned in an interface and/or inside a contaminated media chamber channel.

A concentrate chamber may have a structure corresponding to a contaminated media chamber and be configured to receive concentrate flowing out of each ceramic element. For example, a concentrate chamber may have a cavity, an outlet, and/or a ceramic element interface comprising at least one aperture (e.g., at least one frusto-conical aperture).

A contaminated media chamber and/or a concentrate chamber may have any desired dimensions. According to some embodiments, a contaminated media chamber and/or a concentrate chamber may have a length from about 10 cm to about 150 cm, from about 20 cm to about 100 cm, from about 15 cm to about 75 cm, and/or combinations thereof. A section taken perpendicular to a chamber's longitudinal axis may have a longest dimension (e.g., diagonal or diameter) from about 2 cm to about 30 cm in diameter, from about 2 cm to about 20 cm in diameter, from about 5 cm to about 20 cm in diameter, from about 5 cm to about 15 cm in diameter, from about 10 cm to about 45 cm in diameter, and/or combinations thereof. The shape and/or dimensions of a contaminated media chamber and a concentrate chamber may be the same or different.

Permeate Chamber

The present disclosure relates, in some embodiments, to a permeate chamber comprising a ceramic element interface, an interior permeate cavity, and a permeate outlet in fluid communication with the interior permeate cavity. A permeate chamber may have any desired shape. In some embodiments, a permeate chamber may have a generally cylindrical shape defining a central longitudinal axis and a cavity spanning its length. For example, up to all sections perpendicular to a central permeate chamber axis may have a generally annular shape. A permeate chamber may have a hollow, generally cylindrical shape, a first end and a second end according to some embodiments. Each end may define an aperture sized and/or shaped to receive a ceramic element interface.

A permeate chamber may have any desired dimensions. According to some embodiments, a permeate chamber may be from about 10 cm to about 5 m long, from about 50 cm to about 5 m long, from about 1 m to about 3 m long, and/or combinations thereof. A section taken perpendicular to the longitudinal axis may have a longest dimension (e.g., diagonal or diameter) from about 2 cm to about 30 cm in diameter, from about 2 cm to about 20 cm in diameter, from about 5 cm to about 20 cm in diameter, from about 5 cm to about 15 cm in diameter, from about 10 cm to about 45 cm in diameter, and/or combinations thereof.

Ceramic Element

Fluid communication between a contaminated media chamber and a permeate chamber may be mediated by a ceramic element. For example, at least some fluid may flow through an inlet into a contaminated media chamber cavity, through a contaminated media chamber cavity into a ceramic element, through a ceramic element into a permeate cavity, and/or through a permeate cavity and out through a permeate outlet. A ceramic element may comprise, according to some embodiments, a filter and at least one seal gasket. A seal gasket may be configured to limit fluid movement between a contaminated media chamber and a permeate chamber to passage through a filter (bypass). For example, a ceramic element may include a seal that partially, substantially completely, or completely prevents fluid bypass.

A ceramic element may be configured to operate in any desired manner. For example, a ceramic element may be configured for dead-end or crossflow operation. An elongate element may define an interior channel with a longitudinal axis, in some embodiments. A crossflow purification module may include a ceramic element comprising an elongate channel configured such that the element's longitudinal axis is generally parallel to the direction of contaminated media flow and permeate flow is generally radially outward from the longitudinal axis.

In some embodiments, an element may have a wall defining an elongate body having at least one interior channel. An element may comprise a contaminated media-facing surface and a permeate facing surface, in some embodiments. For example, an element may define an elongate body having at least one interior surface (e.g., a contaminated media-facing surface), at least one interior channel, and an exterior surface (e.g., a permeate chamber facing surface). Contaminated fluid may enter at least one interior channel at one end and flow down the length of an element. As it travels along a channel, some fluid may traverse an element wall and form permeate. Some fluid (e.g., a reject stream) may pass all the way along the longitudinal axis of the interior channel and out the distal end.

Ceramic Membrane

A ceramic membrane (also called an element) may comprise, according to some embodiments, a filter of any desired size, shape, or composition. For example, a ceramic membrane may be shaped like a prism comprising a shape selected from a triangular prism, rectangular prism, square prism, pentagonal prism, hexagonal prism, heptagonal prism, octagonal prism, nonagonal prism, or decagonal prism. For example, the prism may comprise a vertex-to-vertex diameter between about 38 mm to about 90 mm A fluid filtration system comprising a membrane housing and a plurality of membranes, comprising from about 1 membrane to about 171 membranes. A fluid filtration system may comprise from about 1 membrane to about 200 membranes. For example, a ceramic element may comprise a generally tubular filter (e.g., a ceramic filter). A ceramic element may include any desired filter or filter material. For example, a ceramic element may comprise a filter having one or more organic polymers and/or one or more ceramic materials. Examples of filters (e.g., ceramic membranes) may include microfiltration filters, ultrafiltration filters, nanofiltration filters, antimicrobial filters, maintenance-free filters, and combinations thereof. A filter may comprise an antimicrobial agent. For example, a ceramic filter may comprise silver (e.g., an impregnated, non-leachable silver). In some embodiments, a ceramic element may exclude a filter e.g., where the element adsorbs ions).

In some embodiments, ceramic filters may be durable (e.g., more durable than organic polymer filters). For example, ceramic filters may be resistant to mechanical damage, solvents, and/or microbes. Example metrics of performance and/or resistance may be the degree of filtration provided for one or more contaminants, conductivity, usable lifespan, and/or combinations thereof. Desired performance and/or resistance may be expressed as a fraction (e.g., percentage) compared in the presence or absence of challenge, relative to another membrane, or against a threshold or target value.

In some embodiments, a ceramic membrane may comprise a ceramic element (i.e., base) and a filter layer (e.g., ceramic coating). For example, a ceramic membrane may comprise a ceramic coating having smaller pores, wherein the ceramic coating comprises alumina; zirconium dioxide; titanium dioxide; or silicon carbide. In some embodiments, multiple ceramic coatings may be applied, wherein the coatings comprise a gradient of pore sizes. The number of ceramic coatings or filter layers may depend on a desired pore size (i.e., each layer or coat being a smaller or larger pore size). A gradient of pore size may prevent a layer from falling into a substrate or membrane layer with a larger pore size. An underlying base or substrate may have larger pores. In some embodiments, a substrate may comprise alumina, zirconium dioxide, titanium dioxide, or silicon carbide. Varying combinations of substrate and ceramic coating compositions may advantageously allow control of ceramic membrane flow rates, which may increase or decrease transmembrane pressure. A ceramic membrane may include a filter layer only inside the channels and an epoxy coating sealing the end face. A ceramic membrane may have at least one channel, defined in the wall, and wherein the channel permits fluid to move from the fluid inlet to the fluid outlet while adsorbing a contaminant and desorbing the permeate. According to some embodiments, a filtration layer may instead cover an interior surface, an end face, and/or an exterior surface. For example, a filtration layer may define, be coextensive with, and/or cover a contaminated media facing surface of an element. A ceramic filtration layer may line the interior surface (e.g., channels), wrap around the face of the element, and extend a portion of the way down the outside of the element (at each end). A base may define, be coextensive with, and/or cover a permeate facing surface.

An elongate ceramic element may have a cross-section (e.g., a section perpendicular to the central longitudinal axis) with any desired regular or irregular geometric shape. For example, an element cross-section may have a shape selected from generally circular, generally elliptical, generally polygonal (e.g., hexagonal), and/or combinations thereof. An elongate element may have a central axis with one or more channels along the length of the element and generally parallel to the axis. A channel may comprise different shapes. For example, the channel cross-sectional shape comprises a shape selected from circle, square, triangle, trapezium, diamond, rhombus, parallelogram, rectangle, pentagon, hexagon, octagon, nonagon, oval, or hexagon. For example, the channel shape may comprise a circle with a diameter from about 4 mm to about 6 mm.

A ceramic element may have any desired dimensions. According to some embodiments, an elongate element may be from about 900 to about 1500 mm long, about 10 cm to about 5 m long, from about 50 cm to about 5 m long, from about 1 m to about 3 m long, and/or combinations thereof. A section taken perpendicular to the longitudinal axis (e.g., "diameter") may be from about 2 cm to about 30 cm in diameter, from about 2 cm to about 20 cm in diameter, from about 5 cm to about 20 cm in diameter, from about 5 cm to about 15 cm in diameter, from about 10 cm to about 45 cm in diameter, and/or combinations thereof. An element may comprise one or more longitudinal channels. For example, an element may have about 37 channels arranged in about 7 rows with from about 4 to about 7 channels in each row. An element may have about 19 channels arranged in about 5 rows with from about 3 to about 5 channels in each row. An element may have channels arranged in a concentric polygonal pattern. Each channel may independently have any desired shape and/or dimension. In some embodiments, a channel may have a generally circular shape with a radius from about 1 mm to about 15 cm, from about 2 mm to about 10 cm, from about 5 mm to about 5 cm, from about 1 cm to about 5 cm, and/or combinations thereof.

Element channels and pores may be distinguished, according to some embodiments, on the basis of size, geometry, and/or function. For example, pores may be one or more orders of magnitude smaller than channels (e.g., from about 2 to about 10 orders smaller), may define an irregular (e.g., convoluted) flow path, and/or admit only molecules below a threshold size. Channels may be one or more orders of magnitude larger than pores, define a regular flow path, and/or admit all or substantially all of a contaminated media (e.g., fluid, suspended particles, and dissolved materials).

A ceramic element, according to some embodiments, may comprise a filter and a substrate. A membrane filter may be applied to a substrate and line each of its channels. A portion of the fluid that flows into each channel passes through the membrane under the influence of back pressure. Contaminants remain inside the channels, and the cleaned fluid flows through the membrane and then through the substrate. In some embodiments, a majority of a ceramic element may comprise substrate material.

A ceramic element (e.g., a substrate) may comprise up to about 100% (w/w) silicon carbide. Silicon carbide (SiC) is a semi-conductor material, meaning that it has electrical conductivity that ranks between that of an insulator and a metal. A semiconductor may change its electrical conductance with the addition of a dopant. For SiC, dopants which increase electrical conductivity may include, for example, boron, aluminum and nitrogen.

A ceramic element may be configured, in some embodiments, to selectively filter a fluid with respect to the sizes of the solids (e.g., dissolved solids, suspended solids) present. For example, a ceramic element may include a membrane having pores sized to separate, exclude, and/or remove contaminants (e.g., particles) on the basis of their size. According to some embodiments, a ceramic element may be configured to separate, exclude, and/or remove contaminants with respect to their charge. For example, a ceramic element may be configured to reduce the number of charged contaminants in a fluid (e.g., a contaminated media, a permeate produced in a prior purification step).

A ceramic element may be configured and operated such that charged contaminants in a fluid (e.g., a contaminated media) adhere to oppositely charged components within the ceramic element. Adhesion between these contaminants and the ceramic element may be sufficiently strong to prevent passage of at least some of the charged particles into the permeate. An electrical current may be applied to a ceramic element, for example, sufficient to instill a net negative charge at the membrane surface.

A ceramic element may have a high (e.g., an extremely high) surface area, in some embodiments. Increasing the length of the membrane to about 1500 mm may increase the surface area to about 50% more surface area in comparison to membranes shorter than about 1500 mm Some embodiments may have no permeate channels, which may increase surface area. The capacity of a ceramic element to absorb charged contaminants may be correlated with surface area.

In some embodiments, adsorption (e.g., species and/or capacity) may be influenced by the distance of substrate through which a fluid passes to reach the permeate side of the element. For example, adsorption capacity of an element having narrow-diameter channels may be greater than an element having wider channels (e.g., assuming the two elements have the same or substantially the same outer dimensions and number of channels). Adsorption capacity of elements having channels of the same diameter may differ where one has fewer channels and the other has more channels—the former having the higher adsorption capacity. One or more parameters may be varied to achieve advantageous adsorption to an element of one (e.g., selective adsorption) or more (e.g., semi-selective adsorption) species compared to 30 other species of the same polarity, according to some embodiments. Purification modules configured to perform selective and/or semi-selective adsorption may be combined to produce one or more desired salts upon desorption of bound ions. For example, a desorption stream from a purification module configured and operated to selectively bind sodium ions may be combined with a desorption stream from a purification module configured and operated to selectively bind chloride ions to form a solution comprising dissolved sodium chloride.

A ceramic element may exclude or include a membrane for removal of particles based on size. Element channels may have any desired size or arrangement. For example, all channels in an element may have the same size and may be arranged in a regular pattern of rows and columns. In some embodiments, each channel may have a diameter independent of other channels in the same element. Channels lined with a filter may be sized or arranged with a view to managing the potential pressure drop across the element when operated. Channels without a filtration layer may be sized or arranged with a view to achieving a desired adsorption capacity.

The present disclosure relates, in some embodiments, to a ceramic membrane. For example, a ceramic membrane may include a substrate configured to have a first surface and a second surface and body having an average pore size of from about 3 µm to about 10 µm, from about 4 µm to about 9 µm, from about 5 µm to about 8 µm, and/or from about 6 µm to about 7 µm. In some embodiments, a ceramic membrane may include a membrane layer on at least a portion of a first surface and/or a second surface of a membrane. A membrane layer may be configured to be as thin as possible or practicable to provide a desired or required filtration capacity at a desired TMP (e.g., the lowest TMP possible or practicable). In some embodiments, multiple coats of a membrane layer may be contacted (i.e., applied) to a substrate. The number of coats contacted to a substrate may depend on a desired pore size (i.e., each layer or coat being a smaller or larger pore size). Each membrane layer may be configured to provide a smaller pore size. In some embodiments, each membrane layer may be configured to provide a larger pore size. Iterative coating of membrane layers having a pore size gradient may prevent a membrane layer from falling into a much larger substrate pore. In some embodiments, decreasing the average pore size of a substrate may enhance support for a membrane layer. This additional support may be displayed in part by membrane layer material generally remaining substantially outside and above substrate pores. A thin membrane may, in some embodiments and under desired conditions, reduce impediments to flow of a fluid through a substrate. A membrane, in some embodiments, may be free of flow channels (channels an order of magnitude (or more) larger than the average pore size). A membrane may be configured to have any desired geometric shape. For example, a membrane may be generally cylindrical. A membrane may have a generally hexagonal prismic shape.

Method of Use

The present disclosure relates, according to some embodiments, to methods for using a purification system and/or apparatus. For example, a purification and/or filtration method may comprise (a) providing a media comprising contaminant solids, a dissolved salt anion, and a dissolved salt cation, (b) aggregating the contaminant solid into particles, and/or (c) removing the particles to form a first partially purified media. Aggregating dissolved contaminants may comprise contacting a contaminated media with a coagulant, a base, air (e.g., with an aeration unit), dissolved oxygen (e.g., with a dissolved oxygen unit), and/or other chemicals to permit and/or promote metal oxidation, reduction, chemical precipitation, chemical coagulation, or combinations thereof. In some embodiments, the final step—step (e)—may be omitted, for example, if only charged species of one polarity (e.g., ammonia) are to be removed.

In some embodiments, the present disclosure relates to methods for using a purification system and/or apparatus. For example, a purification and/or filtration method may comprise (a) providing a media comprising a suspended or dissolved contaminant and a dissolved salt, (b) filtering the media on the basis of size to remove the suspended or dissolved contaminant to form a first partially purified media, (c) contacting the first partially purified media with a first substrate having a net charge of a first polarity under conditions that permit oppositely charged salt ions having a second polarity, opposite of the first, to bind to the first substrate to form a second partially purified media, and/or (d) optionally contacting the first partially purified media with a second substrate having a net charge of the second polarity under conditions that permit oppositely charged salt ions having the first polarity to bind to the second substrate to form a second partially purified media.

The present disclosure relates, according to some embodiments, to methods for using a purification system and/or apparatus. For example, a purification and/or filtration method may comprise contacting a contaminated fluid with a filter (e.g., a ceramic filtration membrane). According to some embodiments, contacting a contaminated fluid with a filter (e.g., a ceramic filtration membrane) may include forming a permeate (e.g., fluid that passes through filter pores) and a concentrate (e.g., fluid that does not pass through filter pores).

In some embodiments, a purification system, apparatus, and/or method may be configured to operate, according to some embodiments, continuously, substantially continuously (e.g., continuously, but for brief maintenance work), semi-continuously (e.g., less than 24 hours per day), periodically (e.g., over regular and/or irregular intervals), on demand, or combinations thereof. In some embodiments, a purification system, apparatus, and/or method may be operated to provide microfiltration, ultrafiltration, and/or nanofiltration of a subject fluid.

According to some embodiments, filtration may be conducted (e.g., a filtration module may be operated) with fewer or no periodic testing (e.g., QA/QC testing). For example, existing water filtration systems may have to be tested daily to assess and/or ensure membrane integrity and leak-free filtration. Configuration of a ceramic element according to some embodiments may alone provide at least the same level of assurance without the need to test as frequently. For example, a ceramic element configuration may provide an assurance of integrity by direct continuous integrity testing through on line particle counter and/or turbidity measurement. A system according to some embodiments of the disclosure may be operated continuously and without interruption for integrity testing. For example, integrity assessments may be conducted during operation.

A method may comprise operating a fluid purification system with any desired throughput (e.g., contaminated media intake, permeate output, concentrate output, and/or combinations thereof), in some embodiments. For example, a method may be scalable to achieve a desired processing volume by varying the number of membrane elements and/or varying the number of modules used.

A first ceramic element may be configured to selectively remove particles on the basis of size. Optional second and third elements may independently be configured to selectively remove contaminants on the basis of charge. In some embodiments, as fluid passes through an element, negative ions adsorb onto the SiC substrate. Permeate may then be sent to a second element module with a negative charge to remove the cations. With a first element that provides filtration based on size (e.g., ultrafiltration), a membrane layer may not be required in any of the subsequent elements or modules. Omission of a membrane may drastically reduce pressure drop.

Subsequent elements modules after the first one may be operated in a dead-end mode. Cross flow may be desirable and/or required for filtration applications; for example, it may provide shear to reduce fouling. Once filtration is performed (e.g., in the first element/module), crossflow may not be required. Operating subsequent elements in a dead-end mode may reduce pump energy requirements. In some embodiments, dynamic shock (to reduce or eliminate membrane fouling) may be applied to membranes, where present. For example, in a system configured to reduce/remove solids in an initial filtration element and charged particles (e.g., dissolved salts) in second and third elements, a dynamic shock may be applied to the first element. In some embodiments, applying a dynamic shock to all elements in a multi-element system may provide a synergistic effect.

In some embodiments, a concentrate tank may be configured as a reaction vessel for metals oxidation, coagulation, hardness removal, and/or combinations thereof. This functionality may be positioned on the concentrate side of a membrane.

Methods of Making

According to some embodiments, methods of making a ceramic membrane may comprise extruding, casting, or centrifugal casting a resilient material into the proper shape before firing. Membranes may comprise inorganic materials selected from alumina, zirconium dioxide, titanium dioxide, or silicon carbide. A membrane may also be made by first preparing a carrier (i.e., substrate), and then applying the membrane to the carrier. In this case, methods of making a membrane may comprise dipping the carrier in a ceramic solution, and then treating with heat (i.e., about 100 to about 2300° C.). In some embodiments, both the substrate preparation and membrane application steps may involve a heat treatment (i.e., about 100 to about 2300° C.). One or more additives may be included in a ceramic mixture, for example, to reduce firing temperatures (which may in turn increase oven life span), and/or to increase porosity, strength and/or charge of a substrate. A binder may also be added to a ceramic solution before it is treated with heat to help with mechanical properties comprising holding it into shape. For example, a binder comprises tylose, polyvinyl acetate, polypropylene, sodium polyacrylate, polypropylene carbonate, carboxymethylcellulose, starches, polyvinyl alcohol, dextrin, wax emulsions, polyethylene glycols, lignosulfonates, paraffins, sodium silicate, magnesium aluminum silicates, and bentonite.

Tylose, as a binder, improves the carrier by not cracking during initial drying and heat treatment and also may provide a relatively smaller pore size (i.e., about 6 µM). A smaller pore size may afford mechanical advantages. For example, the smaller pore size may allow the membrane to be applied without soaking into the carrier.

In some embodiments, to methods for making a ceramic membrane. For example, a method of making a ceramic membrane may include extruding a substrate material comprising a binder, a lubricant, a defoamer, and/or a substrate base to form a length of extruded membrane substrate having at least a first surface (e.g., an interior surface) and a second surface (e.g., an exterior surface). A binder may comprise, for example, a substance selected from tylose, polyvinyl acetate, polypropylene, sodium polyacrylate, polypropylene carbonate, carboxymethylcellulose, starches, polyvinyl alcohol, dextrin, wax emulsions, polyethylene glycols, lignosulfonates, paraffins, sodium silicate, magnesium aluminum silicates, and bentonite. A substrate base may comprise a substance selected from alumina, zirconium dioxide, titanium dioxide, or silicon carbide. In some embodiments, a first surface may define one or more inner channels in an extruded ceramic membrane. A method may further comprise, according to some embodiments, drying and/or firing an extruded membrane substrate to form a ceramic membrane substrate. A method may further comprise contacting or applying a membrane layer to at least a portion of a first surface.

SPECIFIC EXAMPLE EMBODIMENTS

Example embodiments of a ceramic membrane are illustrated in FIG. 1A. Ceramic element 150 comprises channels 151, substrate 153, first face 154, and elongate sides 155. Ceramic element 150 does not include a filtration layer. As shown, ceramic element 150 has a generally circular cross section with generally circular channels 151. Channels 151 extended through ceramic element 257 of FIG. 2A along its length. FIG. 1A illustrates a section view of element 150, the section generally perpendicular to the element's longitudinal axis. Channels 151, as illustrated may have a relatively small diameter (e.g., smaller than channels 250 of FIG. 2A) affording fluid a greater distance of substrate 153 through which to pass before reaching the element's permeate side. Example embodiments of a ceramic membrane are illustrated in FIG. 1B. Ceramic element 150 comprises channels 151, substrate 153, first face 154, and elongate sides 155. Ceramic element 150 does not include a filtration layer. As shown, ceramic element 150 has a generally hexagonal cross section with generally circular channels 151. Channels 151 extended through ceramic element 257 of FIG. 2B along its length. FIG. 1B illustrates a section view of element 150, the section generally perpendicular to the element's longitudinal axis. Channels 151, as illustrated may have a relatively small diameter (e.g., smaller than channels 250 of FIG. 2B) affording fluid a greater distance of substrate 153 through which to pass before reaching the element's permeate side.

Example embodiments of a ceramic membrane are illustrated in FIGS. 2A and 2B. In FIG. 2A, ceramic element 257 comprises channel 250, elongate side 255, first face 251, second face 256, and substrate 253. As shown, ceramic element 257 has a generally circular cross section with generally circular channels 250. Channels 250 extend through ceramic element 257 along its length. A filtration layer 252 is positioned over substrate 253. Outer filtration layer extends from first face 251, along the sides as well as completely covering the inner surface of each channel 250. Filtration layer may wrap around both faces and partially cover the sides on each end of the filter. In FIG. 2B, ceramic element 257 comprises channel 250, elongate side 255, first face 251, second face 256, and substrate 253. As shown, ceramic element 257 has a generally hexagonal prism shape with generally circular channels 250. Channels 250 extend through ceramic element 257 along its length. A filtration layer 252 is positioned over substrate 253. Outer filtration layer extends from first face 251, along the sides to second face 256 as well as completely covering the inner surface of each channel 250. Filtration layer may wrap around both faces and partially cover the sides on each end of the filter.

Example embodiments of a purification module are illustrated in FIG. 3. Purification module 320 comprises contaminated media chamber 322, permeate chamber 330, and concrete chamber 360. As shown, contaminated media chamber 322 and permeate chamber 330 are secured to each other with a plurality of bolts and nuts. Concrete chamber 360 is similarly secured to the distal end of permeate chamber 330. Contaminated media chamber 322 comprises inlet 324, contaminated media chamber body 326, and flange 328. As shown, permeate chamber 330 comprises flanges 331, permeate chamber body 332, and outlet 333.

In operation, fluid-tight seals result in contaminated media moving through inlet 324 into a cavity defined by body 326, and into and through crossflow filters positioned in permeate chamber. Fluid that permeates the filters passes through permeate outlet 333. Fluid that does not permeate the filters enters concentrate chamber 360.

Example embodiments of a permeate chamber with installed filter assemblies are illustrated in FIG. 4. As shown, a plurality of filtration assemblies 440 are inserted in apertures in the end plate of permeate chamber 430. Each ceramic element assembly 440 comprises an elongate ceramic element with gaskets 431 at each end. Ceramic element assemblies 440 have been positioned in apertures in the end plate of permeate chamber 430 such that gaskets 441 form fluid-tight seals at each end of permeate chamber 430. As shown, permeate chamber 430 comprises permeate chamber body 432, and outlet 433.

Example embodiments of a permeate chamber with installed filter assemblies are illustrated in FIG. 5A. As shown, a plurality of filtration assemblies 540 are inserted in apertures in the end plate of permeate chamber 530. Each ceramic element assembly 540 comprises an elongate ceramic element with gaskets 531 at each end. Ceramic element assemblies 540 have been positioned in apertures in the end plate of permeate chamber 530 such that gaskets 531 form fluid-tight seals at each end of permeate chamber 430. As shown, permeate chamber 530 comprises permeate chamber body 532, and outlet 533. As shown, an example embodiment may comprise about 171 engaged ceramic membranes.

Example embodiments of a permeate chamber with installed filter assemblies are illustrated in FIG. 5B. As shown, a plurality of filtration assemblies 540 are inserted in apertures in the end plate of permeate chamber 530. Each ceramic element assembly 540 comprises an elongate ceramic element with gaskets 531 at each end. Ceramic element assemblies 540 have been positioned in apertures in the end plate of permeate chamber 530 such that gaskets 531 form fluid-tight seals at each end of permeate chamber 530. As shown, permeate chamber 530 comprises permeate chamber body 532, and outlet 533. As shown, an example embodiment may comprise about 36 engaged ceramic membranes.

According to some embodiments, a permeate chamber with installed filter assemblies are illustrated in FIG. 6A. As shown, a plurality of filtration assemblies 640 are inserted in apertures in the end plate of permeate chamber 630. Each ceramic element assembly 640 comprises an elongate ceramic element with gaskets 631 at each end. Ceramic element assemblies 640 have been positioned in apertures in the end plate of permeate chamber 630 such that gaskets 631 form fluid-tight seals at each end of permeate chamber 630. As shown, permeate chamber 630 comprises outlet 633. As shown, an example embodiment may comprise about 171 engaged ceramic membranes.

Example embodiments of a permeate chamber with installed filter assemblies are illustrated in FIG. 6B. As shown, a plurality of filtration assemblies 640 are inserted in apertures in the end plate of permeate chamber 630. Each ceramic element assembly 640 comprises an elongate ceramic element with gaskets 631 at each end. Ceramic element assemblies 640 have been positioned in apertures in the end plate of permeate chamber 630 such that gaskets 631 form fluid-tight seals at each end of permeate chamber 630. As shown, permeate chamber 630 comprises outlet 633. As shown, an example embodiment may comprise about 36 engaged ceramic membranes.

Specific example embodiments of a ceramic membrane is illustrated in FIG. 7. In FIG. 7, ceramic element 730 comprises channel 740, and permeate channel 731. As shown, ceramic element 730 has generally circular cross section with generally circular channels 740. Channels 740 extend through ceramic element 730 along its length.

As will be understood by those skilled in the art who have the benefit of the instant disclosure, other equivalent or alternative compositions, devices, methods, and systems for fluid filtration can be envisioned without departing from the description contained herein. Accordingly, the manner of carrying out the disclosure as shown and described is to be construed as illustrative only.

Persons skilled in the art may make various changes in the shape, size, number and/or arrangement of parts without departing from the scope of the instant disclosure. For example, the position and number of inlets, apertures, filters, gaskets, valves, pumps, sensors, and/or outlets may be varied. In some embodiments, filters, seal gaskets, and/or filtration assemblies may be interchangeable. Interchangeability may allow the size and/or kind of contaminates to be custom adjusted (e.g., by varying or selecting the pore size and/or kind of filter used). In addition, the size of a device and/or system may be scaled up (e.g., to be used for high throughput commercial or municipal fluid filtration applications) or down (e.g., to be used for lower throughput household or research applications) to suit the needs and/or desires of a practitioner. Each disclosed method and method step may be performed in association with any other disclosed method or method step and in any order according to some embodiments. Where the verb "may" appears, it is intended to convey an optional and/or permissive condition, but its use is not intended to suggest any lack of operability unless otherwise indicated. Persons skilled in the art may make various changes in methods of preparing and using a composition, device, and/or system of the disclosure. For example, a composition, device, and/or system may be prepared and or used as appropriate for animals and/or humans (e.g., with regard to sanitary, infectivity, safety, toxicity, biometric, and other considerations). Elements, compositions, devices, systems, methods, and method steps not recited may be included or excluded as desired or required.

Also, where ranges have been provided, the disclosed endpoints may be treated as exact and/or approximations as desired or demanded by the particular embodiment. Where the endpoints are approximate, the degree of flexibility may vary in proportion to the order of magnitude of the range. For example, on one hand, a range endpoint of about 50 in the context of a range of about 5 to about 50 may include 50.5, but not 52.5 or 55 and, on the other hand, a range endpoint of about 50 in the context of a range of about 0.5 to about 50 may include 55, but not 60 or 75. In addition, it may be desirable in some embodiments to mix and match range endpoints. Also, in some embodiments, each figure disclosed (e.g., in one or more of the examples, tables, and/or drawings) may form the basis of a range (e.g., depicted value +/− about 10%, depicted value +/− about 50%, depicted value +/− about 100%) and or a range endpoint. With respect to the former, a value of 50 depicted in an example, table, and/or drawing may form the basis of a range of, for example, about 45 to about 55, about 25 to about 100, and/or about 0 to about 100. Disclosed percentages are weight percentages except where indicated otherwise.

All or a portion of a device and/or system for fluid filtration may be configured and arranged to be disposable, serviceable, interchangeable, and/or replaceable. These equivalents and alternatives along with obvious changes and modifications are intended to be included within the scope of the present disclosure. Accordingly, the foregoing disclosure is intended to be illustrative, but not limiting, of the scope of the disclosure as illustrated by the appending claims.

The title, abstract, background, and headings are provided in compliance with regulations and/or for the convenience of the reader. They include no admissions as to the scope and content of prior art and no limitations appreciable to all disclosed embodiments.

What is claimed is:

1. A fluid filtration system comprising:
a membrane housing, the membrane housing comprising:
(a) an inlet configured to receive a contaminated fluid;
(b) a plurality of membranes configured to filter the contaminated fluid to form a permeate, wherein each of the plurality of membranes comprises:
(i) a substrate comprising a binder and having a first face, a second face, at least one inner channel, and an elongate side connecting the first face to the second face;
(ii) a first membrane layer on at least a portion of the first face of the substrate; and
(iii) a second membrane layer on at least a portion of the second face of the substrate;
and
(iv) a third membrane layer on at least a portion of the at least one inner channel,
wherein one of:
each of the first membrane layer, the second membrane layer, and the third membrane layer comprises a larger pore size than the substrate, and
each of the first membrane layer, the second membrane layer, and the third membrane layer comprises a smaller pore size than the substrate
(c) a connector adjacent to the inlet and configured to channel the contaminated fluid to the first end of the plurality of membranes; and
(d) an outlet configured to receive the permeate released from the second end,
wherein the membrane housing encloses the plurality of membranes such that the length of the plurality of membranes is substantially parallel to a longitudinal axis of the membrane housing.

2. The fluid filtration system according to claim 1, wherein each of the plurality of membranes has a length from about 800 mm to about 1,600 mm.

3. The fluid filtration system according to claim 1, wherein the substrate comprises a substance selected from alumina, zirconium dioxide, titanium dioxide, and silicon carbide.

4. The fluid filtration system according to claim 1, wherein at least one of:
up to three coats of the first membrane layer contact at least a portion of the first surface of each of the plurality of membranes,
up to three coats of the second membrane layer contact at least a portion of the second surface of each of the plurality of membranes, and up to three coats of the third membrane layer contact at least a portion of the one or more inner channels of each of the plurality of membranes,
wherein the plurality of membranes further comprises a ceramic coating comprising a substance selected from alumina, zirconium dioxide, titanium dioxide, or silicon carbide.

5. The fluid filtration system according to claim 1, wherein each membrane of the plurality of membranes is a hexagonal prism.

6. The fluid filtration system according to claim 5, wherein the hexagonal prism comprises a vertex-to-vertex diameter between about 38 to about 90 mm.

7. The fluid filtration system according to claim 1, wherein the at least one inner channel comprises a shape selected from circle, square, triangle, trapezium, diamond, rhombus, parallelogram, rectangle, pentagon, hexagon, octagon, nonagon, oval, or hexagon.

8. The fluid filtration system according to claim 1, wherein a section of the at least one inner channel defines a circle having a diameter from about 4 to about 6 mm.

9. The fluid filtration system according to claim 1, wherein the membrane housing comprises from about 1 to about 200 membranes.

10. The fluid filtration system according to claim 1, wherein the membrane housing comprises up to about 171 membranes.

11. The fluid filtration system according to claim 1, wherein the membrane housing comprises from about 30 membranes to about 40 membranes.

12. The fluid filtration system according to claim 1, wherein an effective membrane surface area of the fluid filtration system is from about 0.5 $m^2$ to about 600 $m^2$.

13. The fluid filtration system according to claim 1, wherein the binder comprises a substance selected from the group consisting of tylose, polypropylene, sodium polyacrylate, polypropylene carbonate, carboxymethylcellulose, starches, dextrin, wax emulsions, lignosulfonates, paraffins, sodium silicate, magnesium aluminum silicates, and bentonite.

* * * * *